United States Patent [19]

Imura

[11] 3,821,769
[45] June 28, 1974

[54] SHUTTER RELEASE APPARATUS FOR CAMERA

[75] Inventor: Toshinori Imura, Sakai, Japan

[73] Assignee: Minolta Camera Kabushiki Kaisha, Osaka, Japan

[22] Filed: Aug. 24, 1972

[21] Appl. No.: 283,594

[30] Foreign Application Priority Data
Sept. 4, 1971   Japan.......................... 46-80301

[52] U.S. Cl. ............................................. 95/53 EA
[51] Int. Cl. ............................................. G03b 9/62
[58] Field of Search........... 95/11.5 A, 53 E, 53 EA, 95/10 CT

[56] References Cited
UNITED STATES PATENTS

| 3,218,947 | 11/1965 | Somsitz | 95/11.5 |
| 3,581,633 | 6/1971 | Uno et al. | 95/10 |
| 3,581,647 | 6/1971 | Maronde | 95/53 |
| 3,604,330 | 9/1971 | Fahlenberg et al. | 95/53 |
| 3,626,826 | 12/1971 | Putscher | 95/10 |

Primary Examiner—Samuel S. Matthews
Assistant Examiner—Michael L. Gellner
Attorney, Agent, or Firm—Wolder & Gross

[57] ABSTRACT

An apparatus comprising an exposure time controlling electric circuit including an electromagnet, a shutter mechanism for actuating a shutter opening member upon energization of the electromagnet and for actuating a shutter closing member upon deenergization of the electromagnet, a signal generator for producing an electrical signal to release the shutter upon closing of a switch, a signal receiver detachably mounted on the camera for receiving the electrical signal when mounted on the camera, and a remote control switch to be closed by the output of the signal receiver to initiate the exposure time controlling electric circuit into operation.

15 Claims, 9 Drawing Figures

SHUTTER RELEASE APPARATUS FOR CAMERA

BACKGROUND OF THE INVENTION

The present invention relates to a shutter release apparatus adapted for remote control for use in cameras including an electromagnetically releasable shutter.

Conventional cameras of this type has a construction which requires a signal receiver having a portion to be fitted with the shutter button and drive means such as a motor serving as a drive source for depressing the shutter button.

However, the use of drive means like a motor as the drive source for depressing the shutter button makes the signal receiver complex in construction and heavier in weight and is liable to produce camera shake due to vibration caused by the operation of the drive means for a shutter release action. A photographic fault will therefore arise. Further since the shutter button is generally positioned in a small space, there is a great restriction on the freedom of designing the structure for accommodating the signal receiver.

SUMMARY OF THE INVENTION

An object of this invention is to provide a shutter release apparatus for taking photographs by remote control which does not require a drive source for depressing the shutter button.

Another object of this invention is to provide a signal receiver for taking photographs by remote control which is simplified to the greatest possible extent in its construction and rendered lightweight.

Another object of this invention is to provide an apparatus which does not necessitate to particularly limit the position where the signal receiver is mounted in the camera, thus assuring much greater freedom in designing the signal receiver.

Still another object of this invention is to provide a signal receiver which can be employed as it is as power source means for an electromagnetically releasable shutter.

The apparatus of this invention comprises a shutter mechanism including a latch member to be attracted by an electromagnet included in an exposure time controlling electric circuit to actuate a shutter opening member when the electromagnet is energized, the latch member being so urged as to return to the original position when the electromagnet is deenergized and to actuate a shutter closing member by its returning movement, a signal generator for producing an electrical signal to release the shutter when a switch is closed, a signal receiver for receiving the signal from the signal generator, a switch to be closed by the output of the signal receiver to initiate the exposure time controlling electric circuit into operation, and means for electrically connecting the connection terminals of the signal receiver to the corresponding terminals of the exposure time controlling electric circuit when the signal received is mounted on the camera.

According to the invention, the signal receiver does not require means for depressing the shutter button and the signal receiver can be fitted in the desired setting portion of the camera.

The signal receiver of this invention need not incorporate a drive source such as a motor and is built in a compact and lightweight construction to eliminate objections such as camera shake. Since the signal receiver is designed to be detachably fitted in the power source portion of the exposure time controlling electric circuit in place of its power source means, a power source built in the receiver can be employed also as the power source for the exposure time controlling electric circuit.

Other objects and features of this invention will become more apparent from the following detailed description of embodiments of the invention.

DESCRIPTION OF THE PREFERRED EMBODIMENTS

Figure 1:
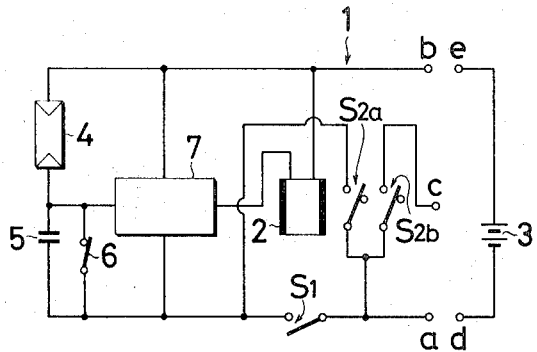
FIG. 1 is a diagram showing an example of the exposure time controlling electric circuit adapted for this invention.

As already known, an exposure time controlling electric circuit 1 shown in FIG. 1 includes an electromagnet 2 and a power source 3. Closing of a main switch $S_1$ immediately energizes the electromagnet 2, and a trigger switch 6, when opened, permits a photocell 4 to start to charge a capacitor 5. The resistance value of the photocell varies in accordance with the brightness of the subject. When the charge of the capacitor 5 builds up to a specified voltage level, a switching circuit 7 functions to deenergize the electromagnet 2.

According to FIG. 1, the power source 3, cut off from the circuit, is detachably connectable to the circuit through terminals $a$, $d$ and $b$, $e$.

The main switch $S_1$ is closed when an unillustrated shutter button is depressed and opened when it returns upward. The trigger switch 6 is opened when the shutter starts to open, while when a shutter opening member is returned to its operation initiating position by tensioning the shutter, the trigger switch is closed to discharge the capacitor 5.

Figure 4:
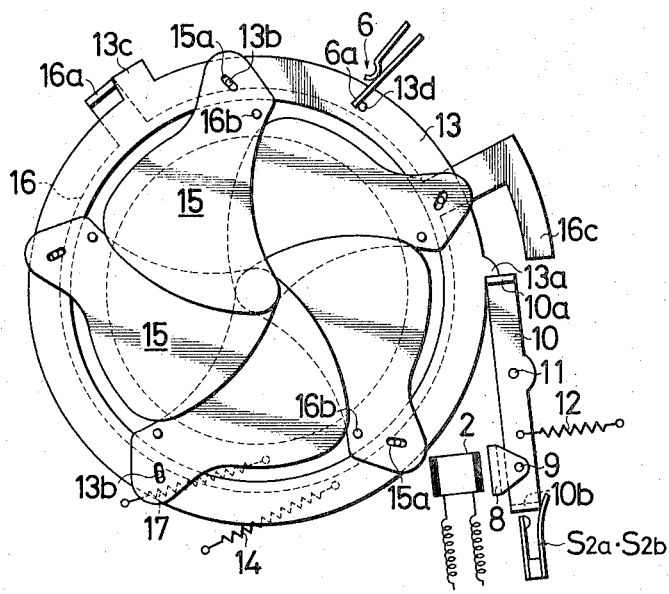
FIG. 4 is a view showing an example of shutter mechanism adapted for this invention.
Figure 5:
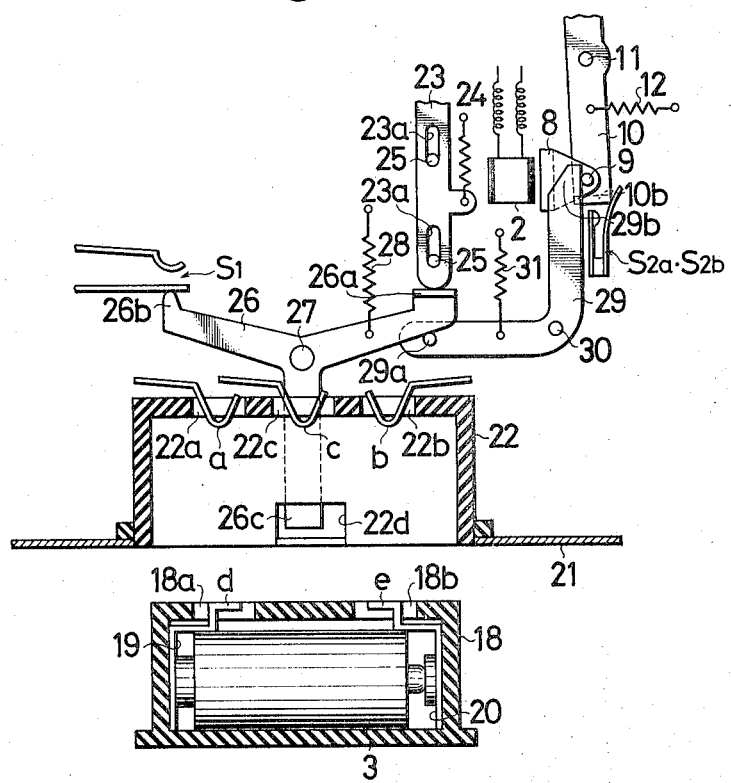
FIG. 5 is a view showing an example of structure for detachably mounting power source means and signal receiver.

The mechanism for operating the trigger switch 6 and the main switch $S_1$ is shown in FIGS. 4 and 5.

FIG. 4 shows an example of shutter mechanism. The electromagnet 2 when energized attracts an attractable piece 8 which is pivotally mounted at 9 on a latch member 10. The latch member 10 is pivoted at 11 to a suitable portion of a camera body (not shown) and urged by a spring 12 in a counterclockwise direction. Since the attraction of the electromagnet 2 is designed to overcome the force of the spring 12, the latch member 10 is moved in a clockwise direction against the spring 12 and halted at the position where the attractable piece 8 is attracted by the electromagnet 2 in engagement therewith.

The latch member 10 has at its upper end a lug 10a which engages with a projection 13a on the outer periphery of a shutter opening member 13 when the shutter is tensioned, so as to retain the member 13 in its cocked position.

The shutter opening member 13 is urged by a spring 14 in a clockwise direction and has pins 13b circumferentially spaced apart by an equal distance and engaged in slots 15a of sectors 15 respectively. The shutter opening member 13 is formed on its outer periphery another projection 13c in engagement with a bent arm 16a extending from the outer periphery of a shutter closing member 16 to keep the member 16 in its cocked position when the opening member 13 is in its cocked position. Thus, the position of the shutter opening member 13 in the cocked state relative to the shutter closing member 16 is such that the shutter is kept closed.

The shutter opening member 13 further has a pin 13d which pushes a movable piece 6a of the trigger switch 6 and closes the switch 6 when the member 13 is brought to its cocked position.

The shutter closing member 16 is urged by a spring 17 in a clockwise direction and carries the sectors 15 pivoted thereto by pins 16b. Thus the sectors 15 open and close the shutter through the shifting of the shutter opening member 13 relative to the shutter closing member 16.

The shutter closing member 16 is provided with an L-shaped arm 16c extending from its outer periphery and having a distal end which, when the member 16 is in its cocked position, faces the lug 10a of the latch member 10 when the attractable piece 8 is in its attracted position.

Thus when the latch member 10 moves in a clockwise direction upon energization of the electromagnet 2, the shutter opening member 13 rotates in a clockwise direction, permitting the shutter closing member 16 to make a slight clockwise rotation, whereupon it is prevented from further rotation by the latch member 10. Accordingly, all the sectors 15 are turned in a clockwise direction about the pins 16b to open the shutter. Further upon the initiation of clockwise rotation of the shutter opening member 13, the trigger switch 6 opens and the charging of the capacitor 5 starts.

When the charge of the capacitor 5 builds up to a specified voltage, the switching circuit 7 functions to interrupt the current supply to the electromagnet 2 and deenergize the same, causing the spring 12 to urge the latch member 10 in a counterclockwise direction to free the shutter closing member 16. As a result, the closing member 16 rotates in a clockwise direction, urging the sectors 15 in a counterclockwise direction to close the shutter.

To tension the shutter, unillustrated means drives the shutter opening member 13 in a counterclockwise direction, permitting projection 13c to push the bent arm 16a and to rotate the shutter closing member 16 in a counterclockwise direction. When brought to the cocked position, the shutter opening member 13 is engaged by the latch member 10, both members 13 and 16 thus being retained in their cocked position. At the same time, the shutter opening member 13 closes the trigger switch 6 to discharge the capacitor 5.

The main switch $S_1$ is closed by depression of the shutter button and opened if the shutter button, freed from the pressure, returns upward, so that if the shutter button should be freed from the depression before the charge of the capacitor reaches the specified voltage during a shutter release action, the main switch $S_1$ would immediately be opened to deenergize the electromagnet 2 and close the shutter, resulting in an underexposure.

To prevent this, there is provided a selfmaintaining switch $S_{2a}$ in parallel with the main switch $S_1$. The switch $S_{2a}$ may be a relay to be operated by the electromagnet 2 so that it will be closed simultaneously with energization of the electromagnet 2 and opened simultaneously with deenergization thereof. Alternatively, the switch may be so disposed as to be turned on and off by a lug at the lower end of the latch member 10 as shown in FIG. 4. The switch assures that the exposure time controlling electric circuit 1 will continue to operate even when the main switch $S_1$ is opened before the charge of the capacitor 5 reaches the predetermined voltage.

FIG. 5 shows means for detachably connecting the power source 3 and mechanism for closing and opening the main switch $S_1$. The power source battery 3 is housed in a battery case 18 made of an electrically insulating material, with its opposite terminals in pressing contact with terminal plates 19 and 20 within the battery case 18 to effect electrical conduction. The terminal plates 19 and 20 have the connecting terminals d and e which are positioned in windows 18a and 18b in the battery case 18.

The camera body 21 has a box 22 made of an electrically insulating material for detachably receiving the battery case 18. The power source connection terminals a and b of the exposure time controlling electric circuit project from windows 22a and 22b formed in the inner wall of the box. The terminals d and e come into contact with the terminals a and b respectively to effect electrical conduction when the battery case 18 is fitted in the box 22. A terminal c projecting into the box 22 from a window 22c will be described later.

Indicated at 23 is a release member to be moved downward by depression of the shutter button (not shown) and urged by a spring 24 so as to return upward when freed from the depression. The release member 23 has a slot 23a in which is engaged a pin 25 on the camera body, the release member 23 thus being retained in upwardly and downwardly movable manner. The lower end of the release member 23 is positioned on the lug 26a of an intermediate lever 26.

The intermediate lever 26 is pivotally mounted as at 27 on the camera body and urged by a spring 28 in a counterclockwise direction, with its lug 26a in contact with the lower end of the release member 23.

Depression of the shutter button moves the intermediate lever 26 in a clockwise direction, causing an arm 26b at the other end of the lever 26 to close the main switch $S_1$. When the shutter button is freed from the depression, the intermediate lever 26 follows the upward return of the release member 23 and rotates in a counterclockwise direction to open the main switch $S_1$.

Disposed beside the intermediate lever 26 is an auxiliary lever 29 which is pivoted at 30 to the camera body and urged by a spring 31 in a clockwise direction. The lever 29 has a pin 29a in contact with the under edge of the intermediate lever 26 so as to be moved in a counterclockwise direction by the depression of the shutter button. The arm 29b of the lever 29 is positioned in the path of the pin 9 on the latch member 9 for supporting the attractable piece 8. The arm 29b is disengaged from the pin 9 by the counterclockwise movement described above and is thereby brought to a position where it will not block the clockwise rotation of the latch member 10 due to the energization of the electromagnet 2, the arrangement being such that the lever 29 will move pivotally in a clockwise direction when the latch member 10 moves in a counterclockwise direction with the shutter button returned upward.

The auxiliary lever helps the latch member 10 move counterclockwise if the residual magnetism of the magnet 2 tends to prevent the member 10 from immediate counterclockwise movement when it is to be urged counterclockwise upon the deenergization of the electromagnet 2. Further in the case where the latch member 10 is adapted to open and close the selfmaintaining switch $S_{2a}$ and a self-maintaining switch $S_{2b}$ to be described later, the auxiliary lever 29 serves to additionally urge the latch member 10 to open the switches $S_{2a}$, $S_{2b}$.

Figure 2:
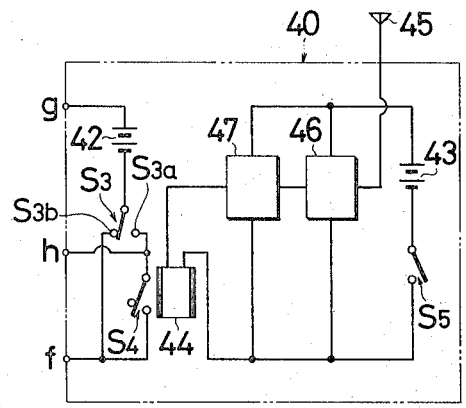
FIG. 2 is a diagram showing an embodiment of electric circuit for the signal receiver of this invention.

A signal receiver 40 comprises a signal receiving electric circuit as shown in FIG. 2 and housed in a case 41 made of an electrically insulating material. The case 41 has a portion 41a which is detachably fitted in the box 22 of the camera body 21.

More specifically, the signal receiver 40 includes a first power source 42 and a second power source 43. The circuit of the first power source 42 has a changeover switch $S_3$ and a remote control switch $S_4$ to be closed and opened by an electromagnet 44 to be energized by the second power source 43. The switch $S_4$ is connected to the first contact $S_{3a}$ of the changeover switch $S_3$ and the second contact $S_{3b}$ of the changeover switch $S_3$ is connected to a bypass for the switch $S_4$. The junction of the first contact $S_{3a}$ and the switch $S_4$ is also provided with a bypass for the switch $S_4$. Connection terminals f, g and h are exposed from a window 41b of the box 41 and positioned in corresponding relation to the connection terminals a, b and c of the exposure time controlling electric circuit 1 located in the box 22. When the signal receiver case 41 is fitted in the box 22, the corresponding connection terminals a and f, b and g, c and h are electrically connected respectively.

Disposed between the terminal c and the self-maintaining switch $S_{2a}$ is another self-maintaining switch $S_{2b}$ which is closed by the energization of the electromagnet 2 and opened by the deenergization thereof, the switch $S_{2b}$ being in parallel to the switch $S_4$. Alternatively, the self-maintaining switch $S_{2b}$ may be turned on and off in operative relation to the latch member 10.

The circuit of the second power source 43 includes, in addition to the electromagnet 44, a signal receiving switch $S_5$ to be turned on and off simultaneously with the changeover switch $S_{3a}$, a signal receiving circuit 46 to be supplied, as an input, with an electrical signal received by an antenna 45, and a switching circuit 47 to be operated by the output of the receiving circuit 46. When the antenna 45 receives an electrical signal from a signal generator (to be described later) with the switch $S_5$ closed, the switching circuit 47 is closed, causing the second power source to energize the electromagnet 44 to close the switch $S_4$.

Figure 3:
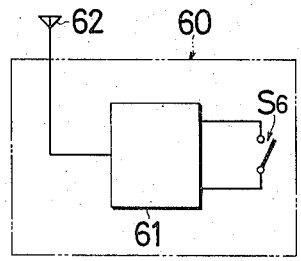
FIG. 3 is a diagram showing an embodiment of electric circuit for the signal generator of this invention.

The signal generator 60 comprises a signal generating circuit 61, as shown in FIG. 3 and housed in a suitable case, which produces an electrical signal when a signal generating switch $S_6$ is closed.

Figure 6:
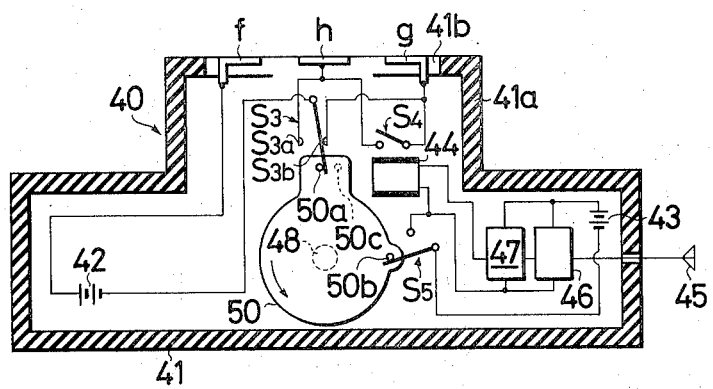
FIG. 6 is a diagram showing an example of interior construction of the signal receiver.
Figure 7:
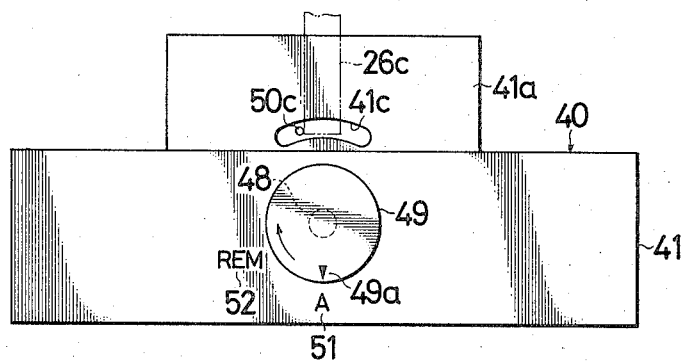
FIG. 7 is a rear view of the signal receiver of FIG. 6 showing the operating portion of the receiver.

The changeover switch $S_3$ and the signal receiving switch $S_5$ are operated by a knob 49 rotatably attached to the signal receiver case 41 by a shaft 48 as shown in FIGS. 6 and 7. A disc 50 is fixed to the shaft 48 for rotation integrally with the knob 49. The disc 50 has pins 50a, 50b and 50c. The pin 50a is in resilient contact with the movable contact piece of the changeover switch $S_3$ and the pin 50b with the movable contact piece of the signal receiver switch $S_5$. The arrangement is such that in the state illustrated in FIG. 6, the changeover switch $S_3$ is closed at its second contact $S_{3b}$ and the signal receiving switch $S_5$ is open. When the disc 50 is rotated in a counterclockwise direction in FIG. 6, the changeover switch $S_3$ is opened at the second contact $S_{3b}$ and closed at the first contact $S_{3a}$ and the signal receiving switch $S_5$ is closed.

In FIG. 6, the pin 50c extends from the rear side of the disc 50 through the window 41c of the signal receiver case 41 and through the window 22d of the box 22 of the camera body to contact the distal end of arm 26c of the intermediate lever 26 as seen in FIG. 7, the arrangement being such that the clockwise rotation of the knob 49 causes the pin 50c to push and pivotally move the intermediate lever 26. Through this operation, the intermediate lever 26 moves clockwise in FIG. 5 to close the main switch $S_1$.

Thus when a mark 49a is set to an indication A at 51 on the signal receiver case 41 by manipulating the knob 49 and the portion 41a of the case 41 is fitted in the box 22 of the camera body 21, a circuit is obtained which is exactly the same as when the power source case 18 is fitted in the camera body 21. More specifically, the first power source 42 within the signal receiver case 41 plays exactly the same role as the power source battery 3 in the power source case 18, with the result that the shutter button, when depressed, closes the main switch $S_1$ to release the shutter.

If the mark on the knob 49 is set to an indication REM for remote control as at 52, the changeover switch $S_3$ is opened at the second contact $S_{3b}$ and closed at the first contact $S_{3a}$, with the signal receiving switch $S_5$ closed, permitting the intermediate lever 26 to close the main switch $S_1$.

If the switch $S_6$ of the signal generator 60 is then closed through an unillustrated button, the signal generating circuit 61 functions to emit an electrical signal from the antenna 62 which signal is received by the antenna 45 of the receiver 40. Consequently, the signal receiving circuit 46 and switching circuit 47 operate, causing the second power source 43 to energize the electromagnet 44, which in turn closes the switch $S_4$. Since the main switch $S_1$ has already been closed mechanically, the first power source 42 energizes the electromagnet 2 to release the shutter as already described.

Because the electromagnet 2 when energized closes the self-maintaining switch $S_{2b}$, the electrical signal from the signal generator 60 has only to serve the purpose of energizing the electromagnet 44 to thereby close the switch $S_4$. Even if the electromagnet 44 of the signal receiver 40 is deenergized to open the switch $S_4$ immediately after the closing of the self-maintaining switch $S_{2b}$, the switch $S_{2b}$ keeps the bypass of the switch $S_4$ closed, permitting the exposure time controlling electric circuit 1 to operate properly, free of any objections.

In this way, the self-maintaining switch $S_{2b}$ enables the signal generator 60 to produce the electrical signal for the shortest possible period of time and serves to prevent drain on the power source (not shown) for the signal generator and the second power source 43 for the signal receiver.

Figure 8:
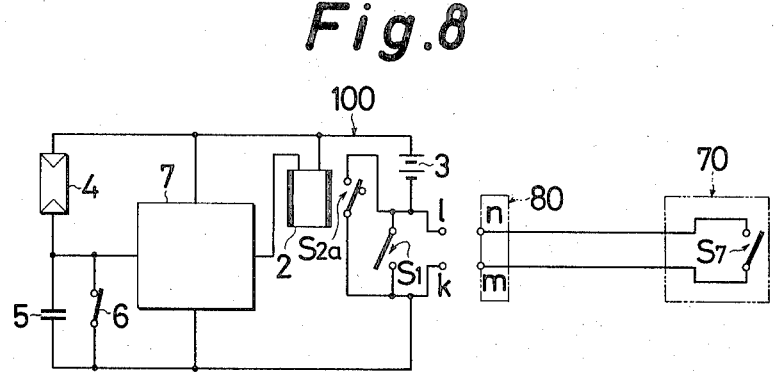
FIG. 8 is a diagram showing another embodiment of electric circuit for signal generator and receiver.

While the embodiment described above operates on a wireless signal transmitting system, FIG. 8 shows an embodiment in which the signal is transmitted through a wire system.

A signal generator 70 includes a switch $S_7$ for emitting a shutter release signal to be operated by a push button or the like. A signal receiver 80 has terminals $m$ and $n$ for connection in series with the main switch $S_1$ of an exposure time controlling electric circuit 100 which is provided with terminals $k$ and $l$ in corresponding relation to the terminals $m$ and $n$. The signal receiver 80 is housed in a case similar to that in the foregoing embodiment as a cassette type unit or a plug to be fitted in a portion of the camera body. The switch $S_7$ when closed effects a shutter release action for a remote control operation.

Figure 9:
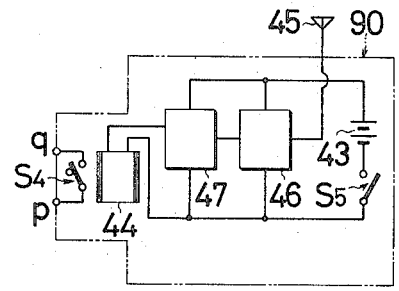
FIG. 9 is a diagram showing another embodiment of electric circuit for signal receiver.

FIG. 9 shows a signal receiver 90 employing a wireless signal transmitting system. The first power source is incorporated in the camera body. A switch $S_4$ to be turned on and off by the electromagnet 44 of the receiver is adapted for connection in parallel with the main switch $S_1$ as shown in FIG. 8. To connect the switch $S_4$ in parallel with the main switch $S_1$, there are provided terminals $p$ and $q$ corresponding to the terminals $k$ and $l$ of the exposure time controlling electric circuit 100 as shown in FIG. 8. As in the embodiment of FIGS. 1 to 7, the signal receiver 90 is of the cassette type or the like and is detachably fitted in the camera body.

By closing the switch $S_6$ of the signal generator (see FIG. 3) for a remote control operation, the switch $S_4$ is closed to energize the exposure time controlling electric circuit 100 for a shutter release action.

In this way, the signal receiver is simplified in construction of its circuit and made easier to handle.

Needless to say, the shutter button, when depressed, closes the main switch $S_1$ to energize the exposure time controlling electric circuit 100 in the embodiments of FIGS. 8 and 9.

In FIGS. 8 and 9, the parts similar to those of FIGS. 1 and 2 are referred to by the same reference numerals and characters.

What is claimed is:

1. A shutter release apparatus for a camera comprising:
   a camera housing including;
   a shutter release button,
   an electric circuit operable in accordance with a time constant for controlling an exposure time including an electromagnet to be energized in response to a first electrical shutter release signal and deenergized by the operation of the circuit after the lapse of time corresponding to the time constant,
   first switching means for providing said first electrical shutter release signal upon a shutter release action by the shutter release button,
   a first pair of terminals for introducing a second electrical shutter release signal from outside of said camera housing into said electrical circuit to energize said electromagnet, and
   a shutter mechanism including a latch member operable by the attraction of said electromagnet to actuate a shutter opening member when said electromagnet is energized, the latch member being returnable to its original position to actuate a shutter closing member when said electromagnet is deenergized;
   a receiver mounted on the camera housing and including a second pair of terminals connectable to said first pair of terminals; and
   a control section remote from and connected to said receiver and including second switching means for providing said electric circuit by way of said receiver with said second electrical shutter release signal through the terminal connection in response to the actuation of said second switching means.

2. A shutter release apparatus for a camera comprising:
   a camera housing including;
   a shutter release button,
   an electric circuit operable in accordance with a time constant for controlling an exposure time including an electromagnet to be energized in response to a first electrical shutter release signal and deenergized by the operation of the circuit after the lapse of time corresponding to the time constant,
   first switching means for providing said first electrical shutter release signal upon a shutter release action by the shutter release button,
   a first pair of terminals for introducing a second electrical shutter release signal from outside of said camera housing into said electrical circuit to energize said electromagnet, and
   a shutter mechanism including a latch member operable by the attraction of said electromagnet to actuate a shutter opening member when said electromagnet is energized, the latch member being returnable to its original position to actuate a shutter closing member when said electromagnet is deenergized;
   a signal generator for producing an electrical signal when a switch is closed; and
   a signal receiver mountable on the camera housing including a second pair of terminals connectable to said first pair of terminals and further including second switching means for providing said electric circuit with said second electrical shutter release signal through the terminal connection in response to the electrical signal from said signal generator.

3. The shutter release apparatus as set forth in claim 2 wherein the first switching means includes a main switch for energizing the circuit to be closed by depression of the shutter button and opened by upward return of the shutter button and comprising a self-maintaining switch closed by the energization of the electromagnet and opened by the deenergization thereof, the self-maintaining switch being connected in parallel with the main switch.

4. The shutter release apparatus as set forth in claim 3 wherein the camera has a mounting portion for interchangeably receiving power source means of the exposure time controlling electric circuit or the signal receiver, the signal receiver including a first power source and a second power source, the electric circuit of the first power source having a changeover switch to be operated by an operating portion, a remote control switch connected to the first contact of the changeover switch and a circuit connected to the second contact of the changeover switch for bypassing the remote control switch, the exposure time controlling electric circuit including another self-maintaining switch to be disposed in parallel with the remote control switch and to be closed by the energization of the electromagnet and opened by the deenergization thereof, the remote control switch being adapted to be closed by the output of electric circuit of the second power source to energize the exposure time controlling electric circuit.

5. The shutter release apparatus as set forth in claim 4 wherein the operating portion is provided with means for switching the changeover switch and for turning on and off a signal receiving switch included in the electric circuit of the second power source and the main switch of the exposure time controlling electric circuit at the same time in operative relation to the turning on and off the first contact of the changeover switch.

6. The shutter release apparatus as set forth in claim 3 wherein the signal receiver has a remote control switch to be connected in parallel to the main switch of the exposure time controlling electric circuit through the terminal-connection and means for closing the remote control switch in response to the signal from the signal generator and the exposure time controlling electric circuit includes a power source means therefor.

7. The shutter release apparatus as set forth in claim 6 wherein the signal generator has a construction for transmitting a signal to the signal receiver through a wire system and the remote control switch is included in the signal generator.

8. The shutter release apparatus as set forth in claim 6 wherein the signal generator transmits a signal to the signal receiver through a wireless system and the remote control switch is included in the signal receiver.

9. The shutter release apparatus as set forth in claim 3 wherein the signal generator has a remote control switch connected to said second terminals of the with a wire system and said first terminals of the time controlling are connected in parallel with the main switch.

10. The shutter release apparatus as set forth in claim 2 wherein the camera housing further includes a mounting portion for interchangeably receiving a power source means of the exposure time controlling electric circuit or the signal receiver which includes another power source means of the exposure time controlling electric circuit.

11. The shutter release apparatus as set forth in claim 10 wherein the signal receiver further includes a remote control switch connected in series with the other power source means, the remote control switch being closed in response to the signal from the signal generator for energizing the electromagnet.

12. The shutter release apparatus as set forth in claim 2 wherein the signal receiver includes a first power source and a remote control switch connected in series with each other between the second terminals for energizing the electromagnet through the terminal-connection when the remote control switch is closed, and means with a second power source for closing the remote control switch when the signal is received from the signal generator.

13. The shutter release apparatus as set forth in claim 2 wherein the camera housing includes a main switch for the electric circuit to be closed by depression of the shutter button and the signal receiver includes a remote control switch which is closed in response to the signal from the signal generator, a power source connected between the second terminals in series with the remote control switch, a bypass switch connected in parallel with the remote control switch, and change-over means movable between a first position closing the bypass switch to allow the electromagnet to be energized upon the depression of the shutter button and a second position opening the bypass switch and closing the main switch to allow the electromagnet to be energized upon the closure of the remote control switch.

14. The shutter release apparatus as set forth in claim 13 wherein the camera housing further comprises a self-maintaining switch connectable in parallel with the remote control switch of the signal receiver which is mounted on the camera housing, the self-maintaining switch being closed by the energization of the electromagnet and opened by the deenergization thereof.

15. The shutter release apparatus as set forth in claim 2 wherein the signal receiver comprises a remote control switch for energizing the electromagnet upon the closure thereof, another electromagnet for closing the remote control switch by the energization thereof, and a circuit including a signal receiving circuit and a switching circuit for energizing the other electromagnet when the signal receiving circuit receives the signal from the signal generator.

* * * * *